United States Patent [19]
Spaulding

[11] 3,760,668
[45] Sept. 25, 1973

[54] WORKPIECE SUPPORT/APPARATUS AND METHOD FOR SHEARING

[75] Inventor: Ronald L. Spaulding, Milan, Ind.

[73] Assignee: Spaulding, Inc., Cincinnati, Ohio

[22] Filed: Aug. 3, 1972

[21] Appl. No.: 277,806

[52] U.S. Cl............................ 83/13, 83/157, 83/701
[51] Int. Cl.............................................. B26d 7/06
[58] Field of Search .................. 83/13, 23, 157, 701

[56] References Cited
UNITED STATES PATENTS

| | | | |
|---|---|---|---|
| 2,793,693 | 5/1957 | Menk | 83/157 |
| 2,933,966 | 4/1960 | Dehn | 83/157 X |
| 3,600,995 | 8/1971 | Hanni | 83/157 |
| 3,670,611 | 6/1972 | Jarman | 83/157 X |

Primary Examiner—Frank T. Yost
Attorney—Daniel P. Worth

[57] ABSTRACT

Heavy metal plate is sheared using a workpiece support combining a conveyor supported on a pneumatic suspension so that the support can tip and move while supporting the plate during shearing.

14 Claims, 9 Drawing Figures

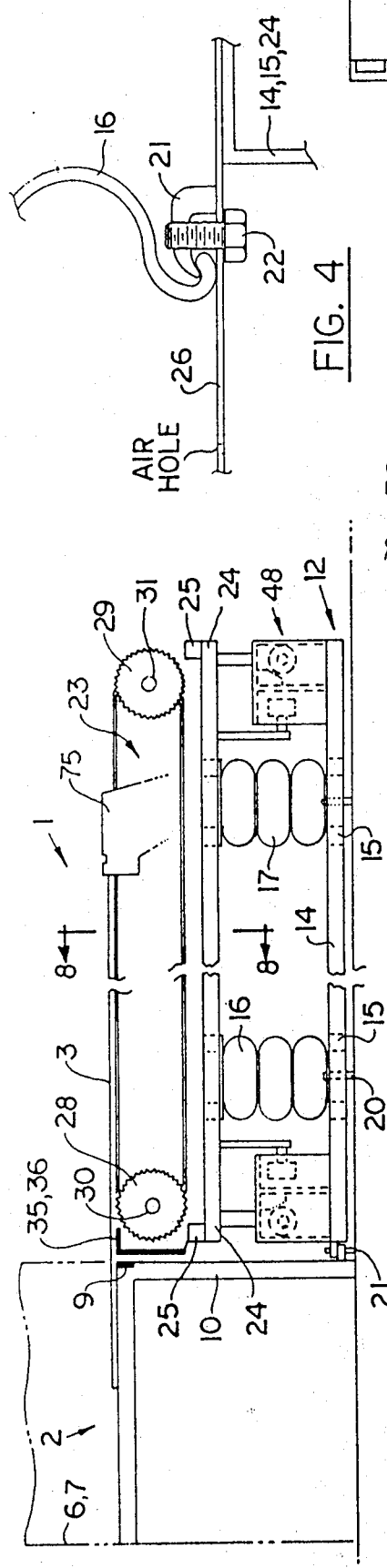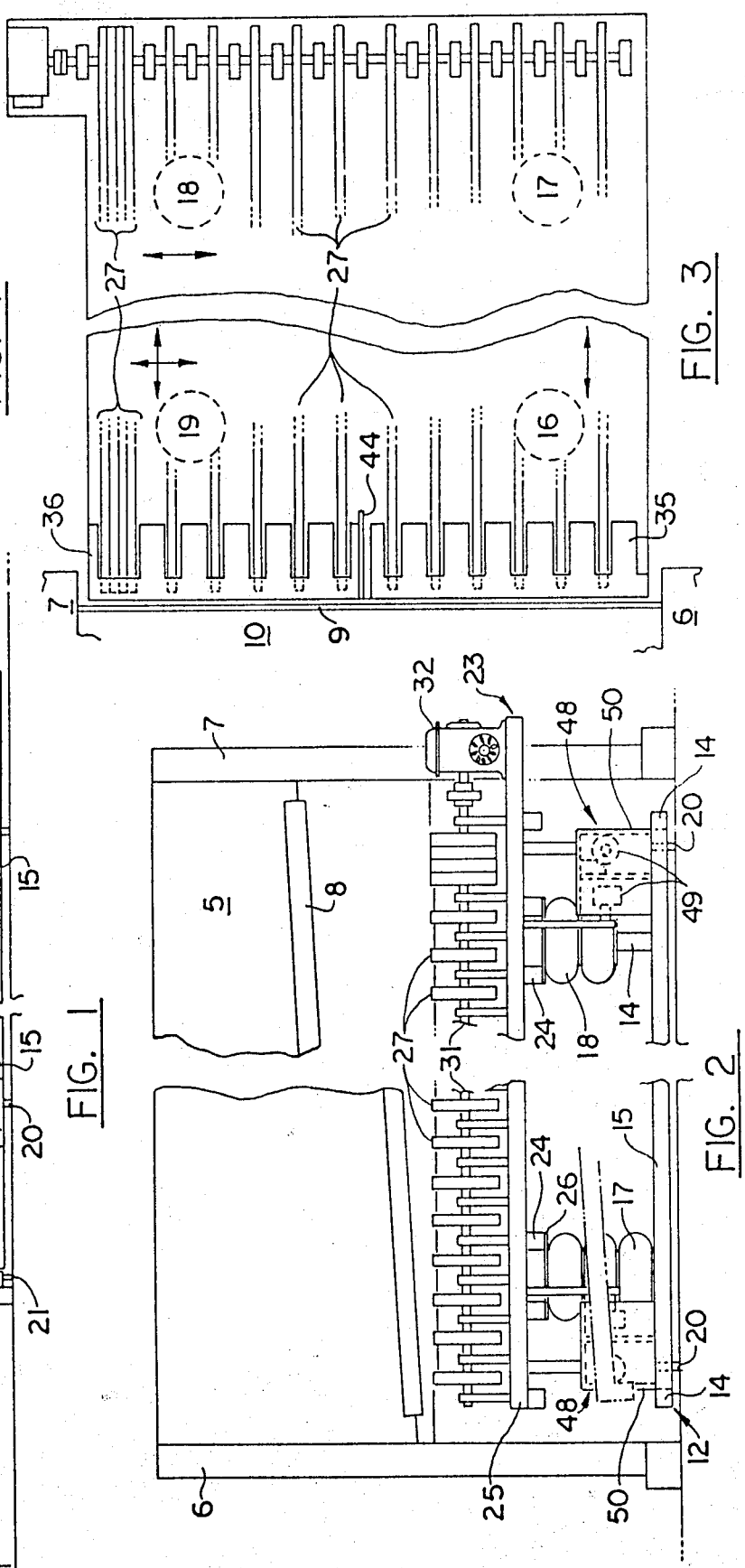

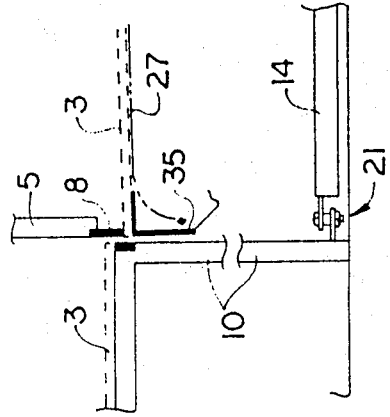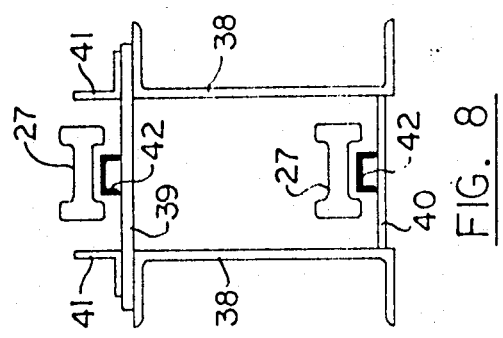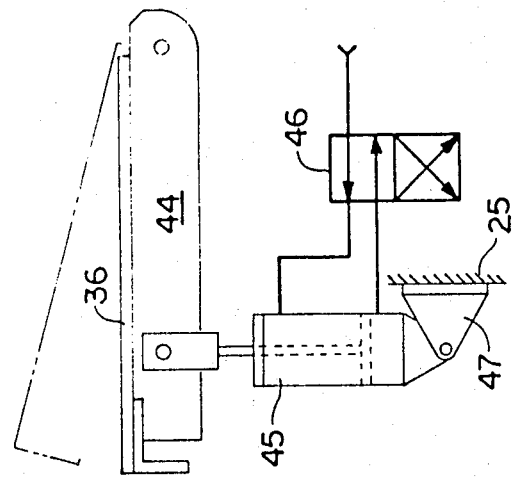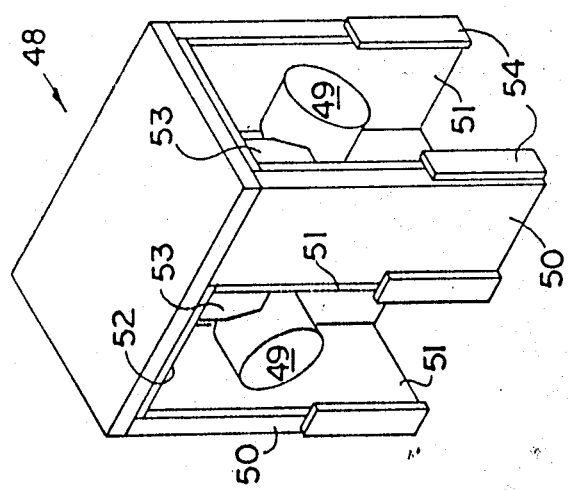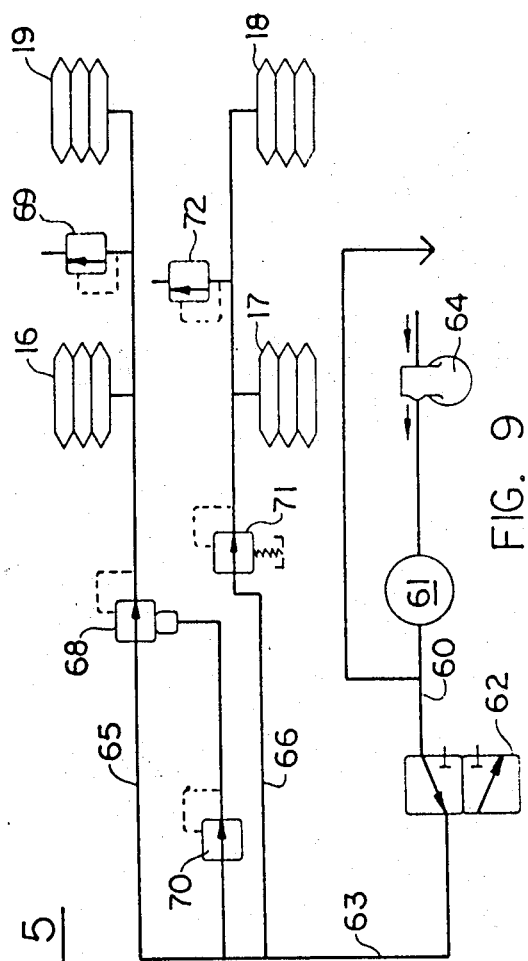

WORKPIECE SUPPORT/APPARATUS AND METHOD FOR SHEARING

SUMMARY AND BACKGROUND OF INVENTION

This invention relates to an improvement in method and apparatus of the sort employed for shearing metal plate. One aspect of the invention relates to a workpiece support assembly Rubber a conveyor and that is resiliently supported. An aspect of the invention relates to a workpiece support as aforesaid having pneumatic bellows for the resilient support and as used in shearing heavy steel plate in connection with which and by way of an example the invention will be described.

In shearing metal plate (ordinarily carbon steel plate) a "dog ear" or bent corner often forms on the last edge of the plate to be cut. It is an expensive problem because the plate is heavy — one-fourth inch or more thick — hence difficult to straighten at that corner. Sometimes the product must be thrown away but most of the time extra operations are necessary to flatten the corner to its original flatness.

The art knows to provide some type of workpiece support adjacent the shear to minimize undesired bending and other undesired deformation such as dog ears, bow, twist, and camber in shearing. The art also knows to combine a conveyor with such a support to assist in handling the heavy workpieces some of which exceed a ton (2,000 pounds) in weight. Some types of prior art further provide some means for the conveyor or other support table to tip by pivoting about an axis to attempt to follow the motion of the shear blade while engaged with the workpiece.

Prior art workpiece supports for metal shearing often have one or more of several deficiencies contributing to such undesired bending e.g. dog ears: the plate weight may lower the support elevation so that is is out of vertical alignment with the additional table; support is cam and given the workpiece close FIG. place of the cutting during cutting; means to overcome the two aforesaid items are often complicated by mechanical linkages to the shear; and shear with adjustable rake (generally hydralic shears) often indicate a need for workpiece support adjustments when the rake is adjusted.

The present invention in its preferred embodiment attacks these problems by totally using resilient support such as FIG. bellows to support the conveyor (or FIG. supporting element) at welded proper height relative to the shear table and to continue to support the workpiece during cutting by tipping in a FIGS. or wobbling manner. The present invention is also capable of resetting (returning to its starting position) without any significant effect induced by the plate weight on changes in such weight from one production run to the next or by adjusting the rake. The bellows supports also reduce noise and vibration.

Objects of this invention include providing an improved workpiece support apparatus and method for shearing.

Other objects advantages and features will become apparent from the following specification wherein FIG. 1 is a cutaway side view of the workpiece support assembly illustrating several of the key features such as bellows, cam and follower and relationship to the shear and omitting for clarity unessential details;

FIG. 2 is a rear view of apparatus embodying the invention showing its narrowness or width sufficient to fit within the shear end frames;

FIG. 3 is a top view with chains partially omitted for clarity emphasizing the apron plate, kicker plate, bellows locations, locations of cam and follower;

FIG. 4 is a detail showing how the top and bottom of each bellows is clamped to an adjacent surface;

FIG. 5 is an enlarged view of the cam and follower;

FIG. 6 is an enlarged view of the kicker plate mechanism and schematically shows a pneumatic circuit for operating same and in ghost lines the kicked position;

FIG. 7 is a schematic side view showing the relative positions of the shear blades, workpiece and most active, i.e., most moved corner of the workpiece support assembly at the end of a cutting stroke;

FIG. 8 is an enlarged schematic crossection detail of the chain support members as seen on 8 — 8 of FIG. 1.

FIG. 9 schematically shows a pneumatic control circuit suitable for use with the apparatus of FIGS. 1 – 8.

FIGS. 1 and 2 illustrate the workpiece support and conveyor assembly 1 cooperatively arranged with a shear 2 for shearing a workpiece 3 such as a piece of steel plate.

The shear 2 is of any conventional construction and comprises a ram 5 slidably mounted for vertical motion between end frames 6,7. The ram carries an upper shear knife 8 that cooperates for cutting the workpiece 3 with a lower shear knife 9 that is immovably secured to the shear table 10. The width of the assembly 1 at the shear is such as to fit between the end frames 6,7.

The workpiece support and conveyor assembly 1 comprises a base 12 which preferably is a welded rectangular structure of tubular steel with longitudinal and lateral members 14,25. The lateral members are arranged as in FIG. 4 to support the pneumatic bellows 16,17,18, and 19 and the levelling screws 20 (one at each corner). The assembly is preferably levelled by the screws 20. Positioning bolt and tab sub assemblies 21 (FIGS. 1 and 7) secure the conveyor assembly 1 to the shear table 10.

The bellows 16, 17, 18, 19 are preferably of two types: bellows 16 and 17 are long stroke bellows while bellows 18, 19 are short stroke bellows. The long stroke bellows are on that side or edge of the assembly where the workpiece is first engaged by the raked shear blade 8 (the left side as viewed in FIG. 2). The short stroke bellows are on the last side of the assembly 1 where the shear blade 8 completes its cut through the workpiece 3 (right as viewed in FIG. 2). The long stroke preferably is 10 inches. The short stroke is preferably 2 inches.

The bellows 16, 17, 18, 19 are all resilient, hollow, heavy, flexible fabric reinforced rubber molded into a bellows shape. Commercially they are avilable from the Firestone Tire and Rubber Company, Akron, Ohio as their Airide Products, Model Nos. 314C (long stroke) and 29C (short stroke).

Each bellows 16, 17, 18, 19 is clamped by ring 21 and bolts 22 in the air-tight manner of FIG. 4 at each end to a plate 26 which serves the dual purposes of sealing that end and of connecting the bellows to the base 12 or to the conveyor frame 23 which is also called the support subassembly 23. Thus the bellows 16, 17, 18, 19 constitute the only supporting means between the base 12 and the frame 23. FIG. 4 shows the lower end of bellows 16 as a representative detail it being understood that the same structure is used top and bottom for all four bellows. An air hole is provided in the bottom plates for connection to the pneumatic piping of FIG. 9.

The conveyor frame 23 is preferably a rectangular welded steel frame having lateral and longitudinal tubular steel members 24,25. The members 24 and the base laterals 15 both have plates 26 welded to them and if necessary additional thicknesses or plates 26 as spacers or additional longitudinals (or laterals) supplied likewise as spacers to compensate for the difference in bellows strokes between left and right sides (e.g. FIG. 2, compare bellows mountings 17 and 18).

Thus each bellows is a means to resiliently support the conveyor frame 23 and components mounted thereon. They are capable of moving independently vertically. They are restrained as is the conveyor frame sub assembly 23, from any substantial horizontal motion by additional means preferably the cam and follower 48 described in FIG. 5.

A plurality of generally horizontal conveyor means, preferably chains 27 are supported in the box-like structures of FIG. 8 all of which extend longitudinally. The FIG. 8 structures are welded to laterals 24 and are further described below. Four chains 27 are mounted very close together at one side (see FIGS. 2,3) for ease in handling narrow workpieces.

Chains 27 are used as conveyor means, each being mounted on an idler sprocket 28 and gear 29. All the idler sprockets are keyed or otherwise secured on a common idler shaft 30. All the gear 29 are keyed or otherwise secured on a common drive shaft 31 which is in turn driven by a reversible motor 32 that is secured to the conveyor frame. The motor 32 preferably is electrical or hydraulic.

The conveyor forward edge is composed of apron plate 35 and kicker plate 36 (FIGS. 1 and 3) as the forwardmost elements of the workpiece support 1 or for that matter of the subassembly or frame 23. They form the forward edge of the conveyor. The conveyor chains travel under and behind the apron and kicker plates. The apron plate preferably extends one-half the width of the subassembly 23 and is spaced or gapped from the table 10 and lower shear blade 9 by an amount sufficient to allow the conveyor frame 23 to move up and down during shearing operations but not gapped enough to permit upper shear blade 8 to pass between lower blade 9 and the apron and kicker plates 35, 36.

Kicker plate 36 is a movable apron plate that is movable from its normal position of complete alignment with the apron plate in FIG. 1 to the elevated position of the ghost lines of FIG. 6. The operator selectively and manually actuates the pneumatic circuit of FIG. 6 to "kick" and to return it to align with the apron plate.

The apron and kicker plates are both made to overlie the forwardmost ends of the chains 27 (FIGS. 3) and are attached to the forwardmost ends of the chain support of FIG. 8. Each chain support is preferably built up by welding together standard structural steel members such as side plates 38 of channels, upper and lower decks 39, 40 of flat plate, chain guards 41 of angle iron, all arranged to form a box-like section as shown in FIG. 8. Small channels are welded on the decks to form upper and lower chain supports and wear strips 42 on which the chains 27 ride each of which may be if desired faced with low friction material on its wearing surface.

The four closely arranged chains 27 (FIGS. 2 and 3) are reaved underneath the kicker plate 36 which has (FIG. 6) a plurality of a pivot arms 44 welded underneath. Each of the pivot arms is revolvably secured as by a nut and bolt to a side plate 38 and is pivotally connected to a double acting pneumatic cylinder 45 which the operator selectively manually controls with valve 46 to admit and exhaust air from the respective ends of the cylinder. Air, as noted with the circuit of FIG. 9, can be drawn from an air compressor or other suitable source of compressed air or compressed fluid. The cylinder 45 is in turn rotatably connected to a bracket or brackets 47 that are welded to frame 23, e.g. as shown to lateral 25.

The cam and follower 48 of FIG. 5 and their placement per FIG. 3 maintain lateral and longitudinal alignment. They are necessary because the bellows 16, 17, 18, 19 must each be able to move vertically in independent manner but are unable, being resilient and flexible members, to maintain lateral and longitudinal alignment under plate cutting and shearing forces and to reset with the precision required for shearing plate.

The idea here is to secure a roller type cam follower 49 to the conveyor frame 23 and to secure a cam 50, 51 to the base 12(FIG.2) At least one such cam and follower structure is supplied for constraining lateral and longitudinal motion, respectively. The cams are each a flat vertical steel surface on the plates 50, 51 and are welded to any suitable part of the base close to the bellows. The top of each pair of plates 50, 51 is closed by a top plate 52 which limits the upper motion of conveyor frame 23. Additionally locating wedges 53 are placed at the top to provide precision relocation (when the conveyor frame returns to its starting position) by wedging the follower 49 between the wedge and plate 50.

A small amount of play is allowed in the lower part of the cam plates 50, 51 below the wedge 53. Retainer plates 54 may be secured to the side of the vertical cams 50, 51.

A pair of cam and follower assemblies 48 (one for lateral and one for longitudinal restraint) may be provided at each corner (FIG. 3) adjacent each bellows. It has been found advantageous and is preferred to omit wedge 53 from certain of the assemblies: both wedges 53 are provided in the assemblies 48 adjacent bellows 19 only, to provide no cam and follower wedge 53 at all in the assemblies 48 adjacent bellows 17, to provide the respective pairs adjacent bellows 18 and 16 with one wedge 53 each omitted for longitudinal and lateral positioning respectively. That is, those two assemblies 48 adjacent bellows 18 have wedge 53 only in the lateral and that adjacent bellows 16 has a wedge 53 only in the longitudinal cam and follower 48, respectively. This simplifies assembly and alignment, with no loss of precision in resetting. The arrows in FIG. 3 illustrate the directions of restraint effected by the wedge (if any) at each place.

FIG. 9 schematically shows one form of pneumatic controls for the operation of the resilient supports or bellows 16, 17, 18 and 19. Generally speaking, compressed air is used to inflate all of the bellows to thereby raise the entire assembly 1 to the height of the table 10. When a plate 3 is sheared the air is exhausted from the bellows responsive to the downward cutting motion of the ram 5 and upper blade 8. After the shearing action compressed air is supplied to re-inflate all the bellows and return all to the starting position. The various roller chains 27 are moved by a manually operated switch to actuate motor 32 then to convey the sheared plate away from the shear.

In FIG. 9 a conduit 60 connects the pneumatic control system through a filter 61 to any suitable source of compressed air such as an air compressor 64. A manually operated electrical solenoid normally open three way valve 62 connects conduit 60 either to the bellows or exhausts the entire system in order to collapse all bellows and lower the assembly 1 should the operator desire. A conduit 63 connects the valve 62 to two parallel circuits 65, 66 respectively supplying air to bellows 16, 18 and 17, 19.

The illustrated arrangement has five valves 68, 69, 70, 71, 72 in the bellows circuits. Valves 68 and 69 control the release of air (or prevent its release) from bellows 16, 19 (nearest the shear). Regulator valve 70 is used to adjust or maintain the set point of valve 68. Valves 71 and 72 control the release of air from bellows 17 and 18. Valves 68, 70, 71 are regulator valves that shut off air flow responsive to preset downstream pressures. Valves 69 and 72 are relief valves that exhaust their systems responsive to preset upstream pressure.

In operation a plate 3 is placed on the conveyor assembly 1, moved by operating motor 32 (which is reversible) to a position in the shear (and if one has back gages 75 against the back gages 75 a conventional device that is shown only in ghost lines FIG. 1 and no part of this invention) and the upper shear 8 is then started down. As the shear blade 8 engages the workpiece 3, bellows 16 and to some extent 19 are compressed and build up air pressure therewithin to the point where relief valve 69 releases air to the atmosphere. Similarly as to bellows 17, 18 and relief valve 72. When the shear completes its stroke the relief valves cease exhausting air, close, and air from conduit 60 (e.g. as from an air compressor) enters through regulators 68 and 71 and reinflates the bellows and the system resets and is ready for another cycle of operation.

The cam and followers 48 react during the first portion of a shearing cycle as the shear blade descends by the followers first rolling out of their jammed upper limit position with the wedges (where there are wedges). This allows the followers upon continued downward motion to make use of the play yielded by the absence of a wedge in the lower part of the cam. The cam and follower assemblies 48 thus restrain substantially all horizontal movement of the conveyor frame subassembly 23 in lateral and longitudinal directions. The four corners of assembly 23 thus may each move substantially independently of the others in a vertical direction, thus contributing to the unique tilt or wobble support action of assembly 23 that follows in response to a shearing action.

When the shearing is completed the cam and followers precisely relocate the upper position using the respective wedges 53 and top or upper follower plates 52.

Thus the process for shearing a workpiece as herewith considered includes the steps of:

providing a resiliently supported support 23 that is spaced from the shear by a gap insufficient to allow the upper shear blade 8 to pass without striking the forward edge 35, 36 of said support; positioning a workpiece 3 in the shear across the gap and on the support forward edge; moving the blade down and engaging and shearing the workpiece; and vertically tilting the support both laterally and longitudinally while restraining substantially all horizontal motion of the workpiece or the support in response to the motion of the workpiece in said moving, engaging, and shearing step.

The invention claimed is:

1. A self contained workpiece support and conveyor assembly for use in combination with a shear comprising — a base for placing on a floor or the like adjacent the shear;

a workpiece support subassembly that is positioned above the said base, and has a foward edge;

said support subassembly further comprising a plurality of generally horizontal conveyor means located in about the same plane;

a plurality of means connected between said base and said support subassembly to resiliently support said workpiece support subassembly at a predetermined position above said base and to each permit downward tilting motion of the entire workpiece support subassembly by each such means independently moving substantially vertically responsive to the blade shearing the workpiece and thereafter to return said workpiece support subassembly to the starting position.

2. A subassembly according to claim 1 wherein said means to resiliently support includes means on one side permitting a longer stroke on one side of said support than on the other side.

3. A subassembly according to claim 1 wherein each of said means to support is a fluid pressurized inflatable and collapsible resilient member.

4. A subassembly according to claim 1 wherein each of said means to support is a pneumatic means having a substantially vertically reciprocable element that in response to said blade shearing action gradually collapse by releasing pressure from within to permit said downward tilting motion until the cutting or shearing is completed and then to reset by inflating sufficiently to return to the starting position.

5. A subassembly according to claim 1 wherein said means to support include a plurality of fluid pressure responsive resilient bellows members and motion control means for allowing substantially vertical motion of the bellows while restraining substantially all lateral and longitudinal motion in the horizontal plane.

6. A subassembly according to claim 5 wherein said bellows members are resilient hollow flexible members.

7. A subassembly according to claim 5 wherein said means for allowing while restraining comprises a cam secured to one of said base and subassembly and a roller type follower secured to the other of said base and subassembly, said cam having a substantially vertical cam surface.

8. A subassembly according to claim 7 wherein said cam surface further includes a wedge spaced from said surface, said follower being received therebetween when said subassembly is level with the shear table.

9. In combination with a shear having a table and a raked blade mounted on a ram, an improved workpiece support assembly that comprises — a workpiece support subassembly having a foward edge spaced from the shear table by a gap smaller than said blade thereby underlying at least a portion of said blade and adjustable vertically so that the upper surface of said subassembly is substantially coplanar with the upper surface of the shear table;

means to resiliently support said subassembly and to permit the entire subassembly to move downward and to tilt responsive to the blade shearing a workpiece and after shearing to restore the subassembly to the starting position; and there being no connecting member between the shear and the assembly to cause coaction therebetween except the workpiece during a shearing operation.

10. In the combination according to claim 9 an assembly that further comprises — a base on which said means to resiliently support is located and above which said subassembly is supported.

11. A subassembly according to claim 9 wherein said means to support are a plurality of fluid pressure responsive bellows members and further include as a device to permit said downward tilting motion a pair of cam and follower systems both for guiding said subassembly in substantially vertical direction and each for restraining any substantial motion laterally and longitudinally, respectively, and restoring same to the starting position at the end of each shearing operation.

12. A subassembly according to claim 11 wherein each cam is a substantially vertical surface, each follower is a roller, and a wedge is supported adjacent said surface to receive said roller therebetween when said subassembly is at its starting position.

13. A subassembly according to claim 9 wherein said forward edge has a fixed apron plate and a movable kicker plate in side by side alignment.

14. A process for shearing a workpiece with a guillotine-type blade comprising the steps of — providing a resiliently supported support that is spaced from the shear by a gap insufficient to allow the upper shear blade to pass without striking the forward edge of said support;

positioning a workpiece in the shear across the gap and on the support forward edge;

moving the blade down and engaging and shearing the workpiece; and vertically tilting the support both laterally and longitudinally while restraining substantially all horizontal motion of the workpiece or the support in response to the motion of the workpiece in said moving, engaging, and shearing step, that lateral edge of said support which is the last to be passed by the blade being the last edge to move downwardly.

* * * * *